United States Patent
Stemp

(10) Patent No.: US 8,876,159 B2
(45) Date of Patent: Nov. 4, 2014

(54) KNEE AIRBAG ARRANGEMENT FOR VEHICLES

(76) Inventor: Norbert Stemp, Eichenau (DE)

( * ) Notice: Subject to any disclaimer, the term of this patent is extended or adjusted under 35 U.S.C. 154(b) by 50 days.

(21) Appl. No.: 13/704,641

(22) PCT Filed: Jun. 17, 2011

(86) PCT No.: PCT/DE2011/050021
§ 371 (c)(1),
(2), (4) Date: Jun. 4, 2013

(87) PCT Pub. No.: WO2012/062289
PCT Pub. Date: May 18, 2012

(65) Prior Publication Data
US 2014/0159353 A1 Jun. 12, 2014

(30) Foreign Application Priority Data
Jun. 17, 2010 (DE) .......................... 10 2010 030 194

(51) Int. Cl.
*B60R 21/206* (2011.01)
*B60R 21/2346* (2011.01)
*B60R 21/16* (2006.01)
*B60R 21/231* (2011.01)

(52) U.S. Cl.
CPC .......... *B60R 21/206* (2013.01); *B60R 21/2346* (2013.01); *B60R 2021/161* (2013.01); *B60R 2021/23169* (2013.01); *B60R 21/231* (2013.01)
USPC ....................................... 280/743.2; 280/733

(58) Field of Classification Search
CPC .............. B60R 21/2338; B60R 21/206; B60R 2021/23382; B60R 2021/23169
USPC ................... 280/730.1, 740, 732, 743.2, 733
See application file for complete search history.

(56) References Cited

U.S. PATENT DOCUMENTS

| | | | | |
|---|---|---|---|---|
| 6,155,595 A | * | 12/2000 | Schultz | 280/729 |
| 7,147,247 B2 | * | 12/2006 | Hayakawa | 280/740 |
| 7,201,396 B2 | * | 4/2007 | Takimoto et al. | 280/730.1 |
| 7,232,149 B2 | * | 6/2007 | Hotta et al. | 280/730.1 |
| 7,350,801 B2 | * | 4/2008 | Nakayama | 280/730.1 |
| 7,571,929 B2 | * | 8/2009 | Fukawatase et al. | 280/730.1 |
| 7,578,517 B2 | * | 8/2009 | Fukawatase et al. | 280/730.1 |
| 7,604,252 B2 | * | 10/2009 | Heitplatz et al. | 280/730.1 |
| 7,717,460 B2 | * | 5/2010 | Franke et al. | 280/743.1 |
| 7,766,374 B2 | * | 8/2010 | Abele et al. | 280/730.1 |
| 7,850,198 B2 | * | 12/2010 | Hayakawa et al. | 280/730.1 |

(Continued)

FOREIGN PATENT DOCUMENTS

| | | | |
|---|---|---|---|
| EP | 1262377 A2 | 12/2002 | |
| EP | 1300299 A1 | 4/2003 | |

(Continued)

OTHER PUBLICATIONS

Stemp, Norbert. PCT/DE2011/050021, International Preliminary Report on Patentability, Feb. 25, 2013.

*Primary Examiner* — Karen Beck

(57) ABSTRACT

Knee airbag arrangement for vehicles comprising an airbag module located in a lower area of an instrument panel of a vehicle and an airbag exhibiting an area of lower cross section between the airbag module and the knee impact area which is to catch the knees of a vehicle occupant in the inflated state of the airbag.

8 Claims, 3 Drawing Sheets

(56) References Cited

U.S. PATENT DOCUMENTS

Figure 2:
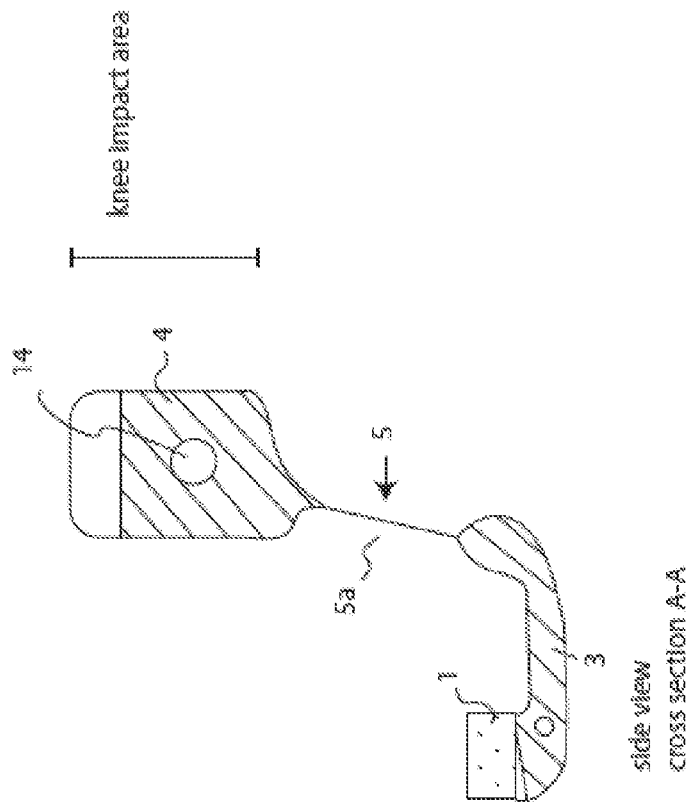

| | | | |
|---|---|---|---|
| 8,042,831 B2 * | 10/2011 | Hoffman et al. | 280/730.1 |
| 8,186,707 B2 * | 5/2012 | Matsushima et al. | 280/730.1 |
| 8,292,322 B2 * | 10/2012 | Thomas | 280/728.2 |
| 8,297,649 B2 * | 10/2012 | Enders | 280/730.1 |
| 8,297,650 B2 * | 10/2012 | Enders | 280/730.1 |
| 8,393,636 B2 * | 3/2013 | Tanaka et al. | 280/730.1 |
| 8,430,422 B2 * | 4/2013 | Wehner et al. | 280/730.1 |
| 8,505,969 B2 * | 8/2013 | Mendez | 280/743.1 |
| 8,540,276 B2 * | 9/2013 | Schneider et al. | 280/730.1 |
| 8,622,418 B2 * | 1/2014 | Chun et al. | 280/730.1 |
| 8,641,085 B2 * | 2/2014 | Przybysz et al. | 280/729 |
| 2002/0149187 A1 * | 10/2002 | Holtz et al. | 280/749 |
| 2003/0120409 A1 * | 6/2003 | Takimoto et al. | 701/45 |
| 2004/0178607 A1 * | 9/2004 | Kawauchimaru et al. | 280/730.1 |
| 2004/0201209 A1 * | 10/2004 | Schwark et al. | 280/743.1 |
| 2004/0245750 A1 * | 12/2004 | Takimoto et al. | 280/730.1 |
| 2005/0057028 A1 * | 3/2005 | Hayakawa | 280/740 |
| 2005/0062265 A1 * | 3/2005 | Hotta et al. | 280/730.1 |
| 2005/0073134 A1 * | 4/2005 | Matsuura et al. | 280/730.1 |
| 2005/0151351 A1 * | 7/2005 | Enders et al. | 280/730.1 |
| 2005/0151352 A1 * | 7/2005 | Abe et al. | 280/730.1 |
| 2006/0076758 A1 * | 4/2006 | Yokoyama | 280/730.1 |
| 2006/0076759 A1 * | 4/2006 | Tanase et al. | 280/730.2 |
| 2007/0200321 A1 * | 8/2007 | Heitplatz et al. | 280/730.1 |
| 2008/0079245 A1 * | 4/2008 | Bito | 280/730.1 |
| 2008/0258441 A1 * | 10/2008 | Takimoto et al. | 280/730.1 |
| 2009/0152839 A1 * | 6/2009 | Thomas | 280/728.2 |
| 2010/0109365 A1 * | 5/2010 | Shibata et al. | 296/37.12 |
| 2010/0117343 A1 * | 5/2010 | Hoffman et al. | 280/730.2 |
| 2010/0181745 A1 * | 7/2010 | Shimono | 280/730.1 |
| 2010/0295279 A1 * | 11/2010 | Fukawatase et al. | 280/730.1 |
| 2011/0095512 A1 * | 4/2011 | Mendez | 280/730.1 |
| 2011/0101660 A1 * | 5/2011 | Schneider et al. | 280/731 |
| 2011/0109070 A1 * | 5/2011 | Tanaka et al. | 280/741 |
| 2011/0241319 A1 * | 10/2011 | Chavez | 280/730.1 |
| 2012/0007345 A1 * | 1/2012 | Lee | 280/728.2 |
| 2012/0025498 A1 * | 2/2012 | Tanaka | 280/730.2 |
| 2012/0049488 A1 * | 3/2012 | Enders | 280/728.3 |
| 2012/0205898 A1 * | 8/2012 | Picard et al. | 280/730.1 |
| 2012/0242066 A1 * | 9/2012 | Chavez et al. | 280/730.2 |
| 2013/0168949 A1 * | 7/2013 | Tanaka et al. | 280/728.2 |
| 2013/0221639 A1 * | 8/2013 | Wallat et al. | 280/730.1 |
| 2013/0270802 A1 * | 10/2013 | Langer et al. | 280/728.3 |

FOREIGN PATENT DOCUMENTS

| | | |
|---|---|---|
| EP | 1354771 A1 | 10/2003 |
| EP | 1431132 A1 | 6/2004 |
| EP | 1518762 A1 | 3/2005 |
| WO | WO/2012/062289 | 5/2012 |

* cited by examiner

KNEE AIRBAG ARRANGEMENT FOR VEHICLES

This application is a National Stage Application under 35 USC 371 of PCT Application No. PCT/DE2011/050021 filed Jun. 17, 2011 (expired), which claims priority to German application 102010030194.9 filed Jun. 17, 2010. The entire content of each of the above-referenced applications is incorporated herein by reference in its entirety.

The present invention relates to a knee airbag arrangement according to the features of claim 1.

Modern, high-value vehicles are increasingly equipped with knee airbags, which are designed to prevent that the driver and passenger, respectively, is thrown with his knees too far forward in a crash. Specifically, the invention relates to knee airbag arrangements in which the knee airbag module is arranged in a lower portion of the instrument panel. If the airbag is triggered the airbag is firstly unfolded some distance downwards and subsequently along the instrument panel cover upwards.

The object of the invention is to provide a cost-efficient knee airbag arrangement having a high reliability.

This object is solved by the features of claim 1. Advantageous embodiments and further developments of the invention are disclosed in the dependent claims.

Starting point of the invention is a knee airbag arrangement for vehicles with an airbag module, which is arranged in a lower portion of an instrument panel of a vehicle.

The core of the invention is that an airbag of the knee airbag arrangement has an area of a smaller cross section in an area between the airbag module and a knee impact area, i.e. an area of the airbag that is designed to catch the knees of a vehicle occupant in the inflated state of the airbag.

For example, the area of smaller cross section can be achieved by "gas guiding walls" being arranged in said area inside the airbag and being stitched off the airbag or by "stitched lines". The aim of this "operation" is the design of a knee airbag in which the gas volume is distributed optimally. The gas volume should preferably be provided only where it is actually needed, in particular in the knee impact area of the airbag. The volume and the cross section of the other areas of the knee airbag, respectively, can be significantly smaller. All in all the volume of the airbag is therefore minimized to a necessary minimum, which allows the use of a relatively small, cost-effective gas generator.

An area being sewed can be present in the area between the airbag module and the knee impact area. Said sewed area is nearly or completely free of gas in the inflated state of the airbag.

Alternatively or additionally, a gas guiding wall formed of fabric material may be sewed inside the airbag, wherein the gas guiding wall extends substantially in a flow direction and at an angle of less than 45°, respectively, with respect to the main flow direction of the gas flowing into the airbag when the airbag is triggered. On the one hand the volume of the airbag can be minimized in airbag areas for which no impact of the occupant is expected by one or more of said gas guiding walls. Another, also very important function of such gas guiding walls is the fact that they "channel" the gas flow when the airbag is inflated. Thus, said gas guiding walls help the airbag to reach its final form quickly, i.e. they help the airbag to almost reach its final form (corresponding to the full inflated state) already in the partially inflated mode. Such a gas guiding wall can be provided in the inside of the airbag. Alternatively, several such gas guiding walls may be provided.

In a further embodiment of the invention said at least one gas guiding wall exhibits at least one opening for distributing gas, which opening allows an overflow of airbag gas from one side of the gas guiding wall to the other side of the gas guiding wall. Thus, said opening allows a pressure equalization between the gas chambers located at opposite sides of the gas guding wall.

To reach a defined and very reliable unfolding and inflation, respectively, of the airbag, a special folding system can be provided. Thus, the end of the airbag facing the airbag module may be folded in a zigzag pattern in a non-triggered airbag mode. This ensures that at the beginning of the inflation process, the "remaining part", that is the airbag packet facing away from the airbag module, is completely ejected from the airbag module.

The end of the airbag facing away from the airbag module is preferably rolled up in the non-triggered mode. Lateral areas of the airbag may be turned or folded towards a central area in the non-triggered mode of the airbag.

Firstly, the zigzag folded portion of the airbag is inflated which faces the gas generator when the airbag is triggered, wherein the remaining airbag packet is ejected. Subsequently, the two lateral folded airbag areas open up. In the final phase of the inflation gas also flows in the rolled-up area of the airbag. By such "folding system" a very process reliable airbag unfolding is enabled.

As mentioned above, the knee airbag arrangement according to the invention comprises an airbag module, which is arranged in a lower portion of the instrument panel of a vehicle. The instrument panel has an instrument panel cover which approximately extends downwards from an area being in about knee height of the instrument panel in the direction of the footwell. The instrument panel cover does not cover the airbag module, but rather ends—as seen from the passenger compartment—before the airbag module. The instrument panel cover has there one front lower edge facing away from the passenger compartment of the vehicle. The airbag module itself is covered by an decorative element which is adjoined at the front edge of the instrument panel cover for reasons of design. The decorative element can substantially have a flat design. But, also curved designs are possible. The decorative element has a rear lower edge facing the front lower edge of the instrument panel cover.

To allow an ejection of the knee airbag from the airbag module the decorative element may be formed as a "tearing element". Accordingly, the decorative element has a material weakness along which it ruptures when the airbag module is triggered. The material weakness may be formed linearly, namely in correspondence with or similar to an "H". An H-shaped material weakness defines according to its form a front and a rear flap-like portion, which can each be folded downwards when the airbag module is triggered.

According to the invention, the rear flap-like portion of the decorative element is designed so that it covers the front lower edge of the instrument panel cover in the unfolded mode of the airbag and acts as a "shooting ramp" for the unfolding knee airbag.

It may be supposed that the rear flap-like portion is folded downwards at an angle ranging from 90° to 180° C. when the airbag is triggered so that the flap-like portion covers the front lower edge of the instrument panel cover. Thus, the rear flap-like portion has the function to act as a kind of spoiler for the unfolding knee airbag. It prevents the unfolding knee airbag being damaged at the front lower edge of the instrument panel cover, when it is unfolded upwards along the instrument panel cover.

Such a "shoting ramp" is particularly of advantage for airbag arrangements in respect of which the rear bottom edge of the decorative element is, in the non-triggered mode of the airbag module, slightly higher than the front lower edge of the instrument panel cover compared to a vehicle vertical axis.

This can be advantageous for design reasons. Namely, if the decorative element is at least slightly displaced upwards with respect to the front lower edge of the instrument panel cover, it is ensured that the front of the decorative element can not be seen from the passenger compartment. This allows a very pleasing design. The resulting "stage" between the decorative element and the front lower edge of the instrument panel cover is covered by the "shoting ramp" when the airbag is triggered. Thus, it has no negative impact on the knee airbag and the unfolding of the knee airbag, respectively.

According to another embodiment of the invention the "H-shaped" material weakness is asymmetrically. For example, it may be supposed that the rear flap-like portion is narrower than the front flap-like portion.

Figure 1:
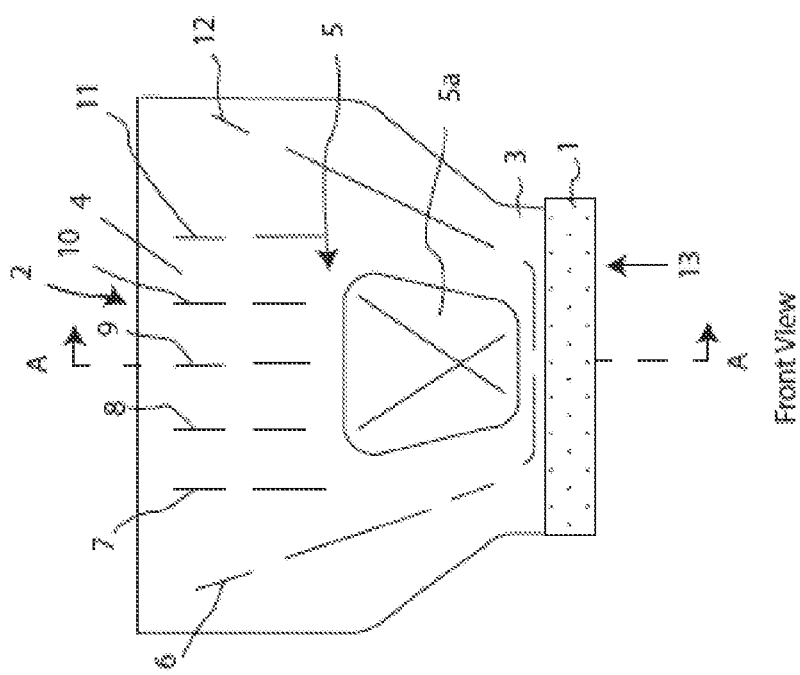
Figure 3:
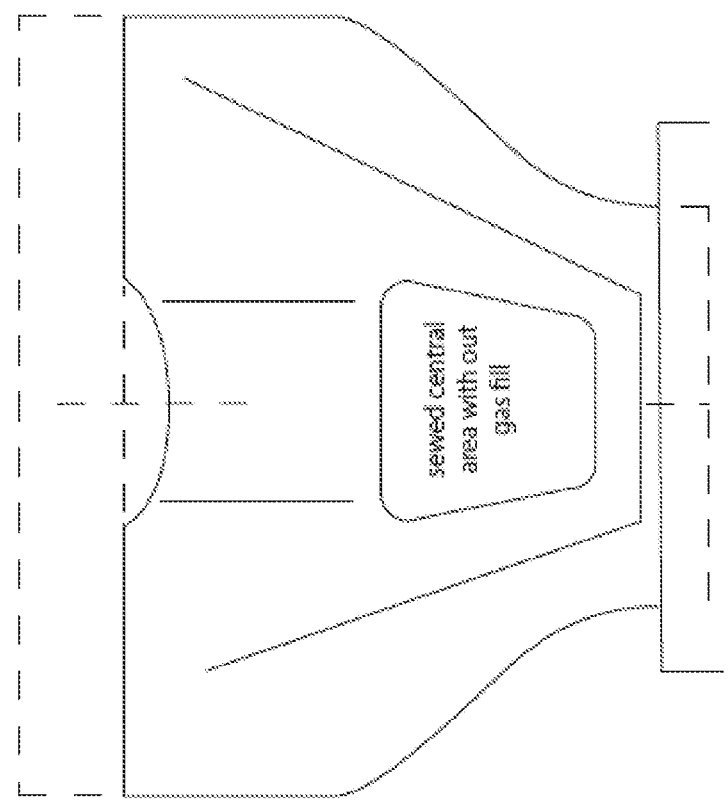
Figure 5:
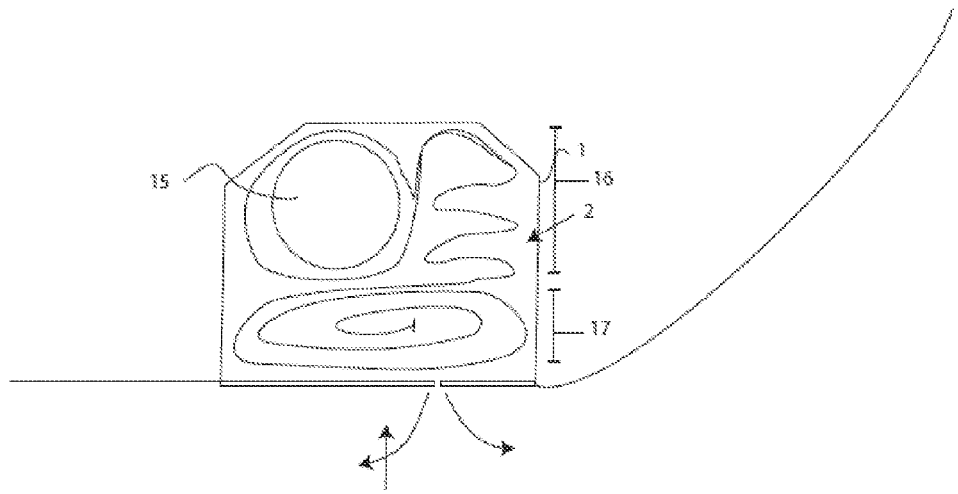
Figure 6:
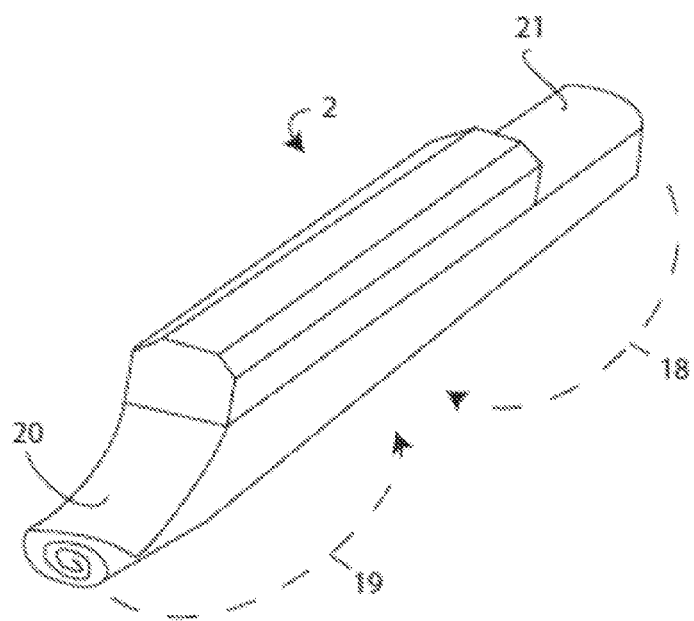

In the following the invention is further described in conjunction with the drawing in more details. Shown are:

FIGS. 1, 2 A first embodiment of a knee airbag according to the invention;

FIG. 3, 4 An embodiment similar to the embodiment shown in FIGS. 1, 2;

FIGS. 5, 6 The folding system of an airbag according to the invention.

FIG. 1 shows, in more details, an airbag module 1 in a knee airbag arrangement not shown here. When an airbag is triggered an airbag 2 unfolds from the airbag module 1. The airbag 2 has a lower portion 3 facing the airbag module 1 and an upper knee impact area 4 facing away from the airbag module 1, and an intermediate area 5.

As shown in FIG. 1 and in particular in FIG. 2, the area 5 has a lower "cross-section of flow" than the area 3, and in particular a considerably smaller cross section than the knee impact area 4. Such a "restriction" has the purpose to reduce the total volume of the airbag to a minimal necessary volume. The total volume of gas should therefore be provided only, or in particular where the risk of an occupant impact exists. In a knee airbag, this is the knee impact area 4. In the area 5 and in the area 3, there is little risk of an occupant impact. Consequently, there is no need of gas volume to be "provided".

In the embodiments shown in the FIGS. 1, 2 the area 5 even comprises an area 5a, which receives no gas volume and which is completely sewn and completely gasless in the inflated state of the airbag 2.

Additionally, gas guiding walls 6-12 are provided in the inside of the airbag. The gas guiding walls 6, 12 are arranged at an angle of about 20° to 25° with respect to the main flow direction 13 of the gas flowing into the airbag 2 when the airbag is triggered. The gas guiding walls 7-11 are substantially arranged parallel to the direction 13 of the gas flowing into the airbag 2 when the airbag is triggered.

Basically, the gas guiding walls 6-12 have two functions. On the one hand they form "restrictions" contributing the minimization of the total volume and the optimization, respectively, of the volume distribution within the airbag 2. On the other hand they channel the incoming gas during the inflation procedure and the effect that the airbag 2 substantially reaches its final shape very rapidly, i.e, well before reaching the fully inflated condition.

As shown in FIGS. 1, 2, for example, the gas guiding wall 9 has a passage opening 14 in the area of the knee impact area, which passage opening acts as a "opening for distributing gas" and which allows an overflow of gas from one side of the gas guiding wall 9 to the other side of the gas guiding wall 9. Thus, it allows a pressure equalization. As shown in FIG. 1, such openings for distributing the gas and passage openings, respectively, are also provided in the other gas guiding walls.

Figure 4:
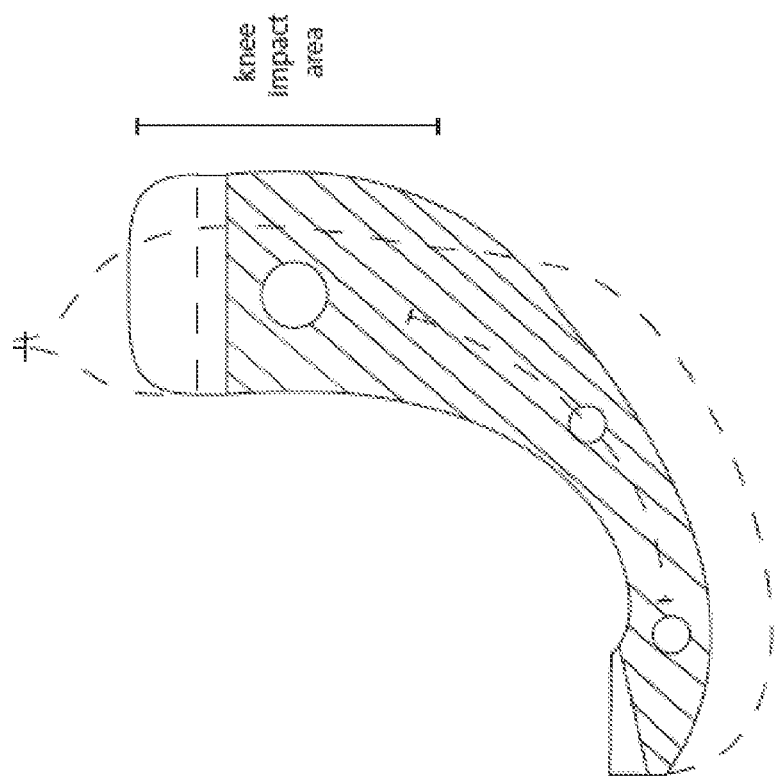

FIGS. 3, 4 show a similar embodiment as FIGS. 1, 2.

The FIGS. 5, 6 describe a possible folding system for a knee airbag according to the invention.

In the non-triggered mode the airbag 2 is folded and located within the airbag module 1. Also within the airbag module 1 a gas generator 15 is provided. An airbag's end 16 facing the airbag module 1 and the gas generator 15, resepectively, is folded in a zigzag pattern. An airbag's end 17 facing away from the airbag module 1 and the gas generator 15, respectively, is rolled up.

As shown in FIG. 5, the airbag module 1 is arranged behind an H-shaped tearing hatch in the area of an underside of a instrument panel not shown.

Not shown in FIG. 5 are lateral areas of the airbag (compare FIGS. 1, 3), which are turned over of folded to a central area of the airbag 2. This is indicated in FIG. 6 by the arrows 18, 19. FIG. 6 shows a mode in which the lateral areas of the airbag are not yet turned over. Before the introduction of the airbag 2 into the housing of the airbag module 1, the lateral areas 20, 21 are folded inwardly corresponding to the arrows 18, 19.

The invention claimed is:

1. A knee airbag arrangement for vehicles with an instrument panel and a passenger compartment, comprising
an airbag module (1), which is arranged in a lower portion of the instrument panel of the vehicle, said lower portion is not visible from the passenger compartment,
an airbag (2), said airbag (2) comprises a knee impact area (4), which is designed to intercept the knees of a vehicle occupant in the inflated state of the airbag (2), a lower area (3) and an intermediate area (5) arranged between the lower area (3) and the knee impact area (4), wherein the airbag (2) exhibits an area of smaller cross section relative to the knee impact area between the airbag module (1) and the knee impact area (4);
wherein the airbag (2) comprises at least one gas guiding wall formed of fabric material, said gas guiding wall is sewed inside the airbag and has a width being greater in the knee impact area than in the lower area (3) and in the intermediate area (5), said gas guiding wall extends substantially in a flow direction of the gas flowing into the airbag when the airbag (2) is triggered.

2. The knee airbag arrangement according to claim 1, further comprising at least one opening (14) for distributing gas in the at least one gas guiding wall, said opening allows a pressure equalization between the gas chambers located at opposite sides of the gas guiding wall (6-12).

3. The knee airbag arrangement according to claim 1, wherein an end (16) of the airbag (2), which end faces the airbag module (1) of the airbag (2) is folded in a zigzag pattern when the airbag (2) is in a non-triggered state.

4. The knee airbag arrangement according to claim 1, wherein an end (17) of the airbag (2), which end facing away from the airbag module (1), is rolled up in the non-triggered state.

5. The knee airbag arrangement according to claim 1, wherein the airbag (2) exhibits lateral areas (20, 21), which are turned towards a central area in the non-triggered state of the airbag (2).

6. The knee airbag arrangement according to claim 1, wherein an instrument panel cover is provided, which extends downwards from an area being in about knee height of the instrument panel and exhibits a front lower edge facing away from the passenger compartment of the vehicle, and a decorative element is provided, which is adjoined at the front lower edge of the instrument panel cover, which decorative element exhibits a rear lower edge facing the front lower edge of the instrument panel cover, covers the airbag module (1) from below in the non-triggered state of the airbag module (1), and exhibits an H-shaped material weakness (10) along which it ruptures when the airbag module (1) is triggered, wherein the material weakness exhibits a front and a rear flap-like portion, which is folded downwards when the airbag module is triggered, wherein the rear flap-like portion is designed so that it covers the front lower edge of the instrument panel cover in the unfolded state and acts as a shooting ramp for the unfolding knee airbag.

7. The knee airbag arrangement according to claim 6, wherein the rear lower edge of the decorative element is slightly displaced upwards than the front lower edge of the instrument panel cover (4) in the non-triggered state of the airbag module (1).

8. The knee airbag arrangement according to claim 6, wherein the rear flap-like portion is narrower than the front flap-like portion.

* * * * *